A. CORBETT.
Incubator.

No. 164,810.

Patented June 22, 1875.

Witnesses
John Becker
Fred. Haynes

A. Corbett
by his Attorneys
Brown & Allen

THE GRAPHIC CO.PHOTO-LITH.39 & 41 PARK PLACE,N.Y.

UNITED STATES PATENT OFFICE.

ADOLPHE CORBETT, OF HICKSVILLE, NEW YORK.

IMPROVEMENT IN INCUBATORS.

Specification forming part of Letters Patent No. 164,810, dated June 22, 1875; application filed July 18, 1874.

*To all whom it may concern:*

Be it known that I, ADOLPHE CORBETT, of Hicksville, in the county of Queens and State of New York, have invented an Improved Incubator and Artificial Chicken-Mother, of which the following is a specification:

My invention relates to certain improvements whereby the apparatus is properly ventilated, the operation of inserting and removing the eggs is facilitated, and means provided for the protection of the young chickens until sufficiently grown.

The invention consists of a chamber composed of staves attached to a top and bottom piece and having a door for inserting and removing the eggs and cleansing the chamber. From the top of the chamber projects a vertical chimney having a slide for regulating the ventilation. Within this chimney is a yoke through which passes a screw-rod, carrying, at its lower end, an artificial mother, as will be hereinafter described.

Figure 1:
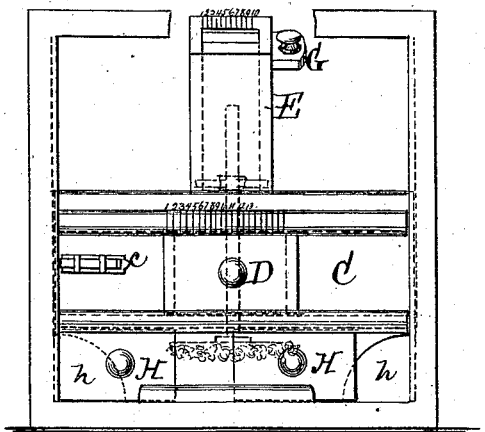
Figure 2:
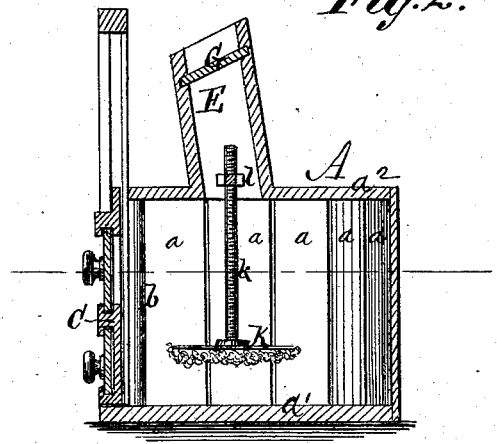
Figure 3:
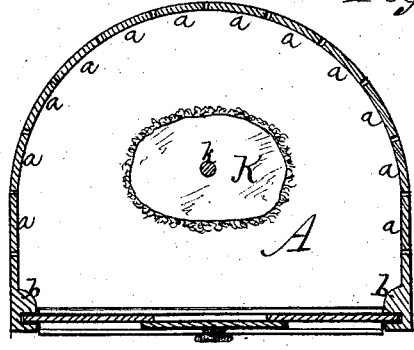

In the accompanying drawing Figure 1 is a front view of an apparatus embodying my improvements. Fig. 2 is a central vertical section. Fig. 3 is a horizontal section.

The chamber A is constructed of staves $a$, which are attached to a bottom piece, $a^1$, and a top piece, $a^2$, which are of semicircular form so as to constitute a semi-cylindrical chamber. The staves $a$ are arranged with slight intervals between them, as shown in Fig. 3, to provide for ventilation and the circulating of heated air through the chamber. At the terminations of the curved portions of the chamber are rounded vertical ribs $b$, which prevent the formation of corners to incommode the young chickens. The front portion of the chamber A is provided with a door, C, to facilitate the introduction and removal of the basket or box containing the eggs, and also to facilitate the cleansing of the chamber when necessary. The door C may be arranged to slide, or to work on hinges, as may be preferred. In the drawing it is shown as arranged to slide vertically, being provided with a bolt, $c$, to hold it in an elevated position. In the door C is an opening, which is covered by a small sliding door, D. In the top of the chamber is a chimney, E, in the upper portion of which is a slide, G, arranged in grooves or guides. The ventilating-current, passing through the chamber is regulated by opening or closing the door D and slide G, the guides in which they work being provided with graduated scales to facilitate their being placed in corresponding positions with relation to each other. In the lower corners of the door C are openings $h$, covered by doors H, arranged to slide in suitable guides. These openings and doors serve to facilitate the introduction and removal of thermometers during the process of incubation, and after the eggs are hatched the openings serve for the egress and ingress of the young chickens.

The artificial mother consists of a follower or pad, K, covered with sheep or lamb skin with the wool on, or other suitable substance. This pad serves to protect the eggs while being hatched, and the young chickens after they are hatched, in the same manner as they are protected by the hen when hatched in the natural way. Projecting upward from the follower K is a screw, $k$, which engages with a thread in a yoke, $l$, arranged in the chimney E, so that it may be raised or lowered to accommodate chickens of different sizes.

The hatching process is accomplished by surrounding the back and sides of the chamber A with stable-manure, the front portion being left uncovered, so that access may be had to the doors. The fermentation of the manure supplies the necessary amount of heat to insure the hatching of the eggs.

What I claim as new, and desire to secure by Letters Patent, is—

The chamber A, constructed of staves attached to the bottom and top pieces, the vertical chimney E, projecting from the top of the chamber, having the slide G, in combination with the artificial mother K, provided with the vertical screw $k$, working in a yoke, $l$, for adjusting the same, all substantially as herein shown and described.

A. CORBETT.

Witnesses:
HENRY T. BROWN,
MICHAEL RYAN.